United States Patent [19]

Pierce et al.

[11] 4,353,201
[45] Oct. 12, 1982

[54] CROP HARVESTING APPARATUS

[76] Inventors: Michael J. Pierce; Kevin J. Pierce, both of 209 North Ridge Hills Court, Grand Forks, N. Dak. 58201; Wayne A. Pierce, Euclid, Minn. 56722

[21] Appl. No.: 213,955

[22] Filed: Dec. 8, 1980

[51] Int. Cl.³ .......................................... A01D 43/02
[52] U.S. Cl. ...................................... 56/364; 56/130
[58] Field of Search ............... 56/130, 364, 14.3, 14.4, 56/14.5, 330

[56] References Cited

U.S. PATENT DOCUMENTS

| | | | |
|---|---|---|---|
| 991,213 | 5/1911 | Van Kooy | 56/219 |
| 2,317,127 | 8/1941 | Bowling | 56/219 |
| 2,729,049 | 1/1956 | Porter | 56/364 |
| 2,780,905 | 2/1957 | Darlington | 56/330 |
| 3,460,332 | 8/1969 | Buchele et al. | 56/130 |
| 3,628,317 | 7/1970 | Lederer | 56/219 |
| 3,940,910 | 3/1976 | d'Acremont | 56/14.4 |
| 3,958,399 | 2/1975 | Schoeneberger | 56/15.8 |

Primary Examiner—Gene Mancene
Assistant Examiner—John J. Wilson
Attorney, Agent, or Firm—Peterson, Palmatier, Sturm, Sjoquist & Baker, Ltd.

[57] ABSTRACT

Our transfer mechanism is attached to the front of a conventional combine. The transfer mechanism includes a number of longitudinally spaced rows of laterally spaced curved teeth or tines that move rearwardly and upwardly so that the tines of each row successively engage a growing or standing crop, such as pinto beans or field peas, lifting the crop sufficiently so that the cutter bar of the combine effectively severs the crop adjacent the surface of the ground. Continued rearward and upward movement of the tines, while still engaging the severed crop, transfers the crop to a more elevated location adjacent the auger. When the tines reach the auger, the shaft on which those particular tines are mounted is angularly rotated so as to release or dump the severed crop onto a curved floor beneath the auger. The auger moves the cut crop laterally and then rearwardly into the threshing portion of the combine.

16 Claims, 5 Drawing Figures

CROP HARVESTING APPARATUS

BACKGROUND OF THE INVENTION

1. Field of the Invention

This invention relates generally to crop harvesting apparatus, and pertains more particularly to a transfer mechanism for attachment to the front of a conventional combine in order to facilitate the cutting of a growing or standing crop and also to the automated movement of the crop immediately after it has been severed by the combine's cutter bar.

2. Description of the Prior Art

While pinto beans, field peas and lodged grain (uncut wheat that has been bent over close to the ground) are each harvested in a somewhat different manner, it can be pointed out that pinto beans, being a vine crop, have presented special problems heretofore. The most common practice has been to first cut the vines, doing so just beneath the surface of the ground. This requires an initial pass of suitable equipment across the field. Then the cut vines are windrowed, requiring a second pass of different equipment across the field. After the vines have been placed in windrows, then a third pass of equipment across the field is needed in order to pick up the windrowed beans. Consequently, the harvesting of dried beans has been performed in three distinct and separate steps.

As far as field peas are concerned, the practice has been to utilize a finger-type pickup which literally grabs the plants, pulling them from the ground by their roots, and then carrying them along the top or upper side of the pickup to the auger of the combine. Such a procedure has resulted in extensive crop loss due to the shelling that results from the rough handling or jostling of the beans. Also, since soil clings to the roots, an objectionable amount of dirt is brought into the combine, producing excessive wear and tear on various parts of the harvesting equipment.

With respect to lodged grain, in the past conventional windrowers have pushed the grain back at ground level, in this way forcing the grain onto the cutter bar. This type of action results in a bunching and shelling of the crop, both of which results are objectionable.

The techniques alluded to above are time-consuming, costly and generally inefficient. Therefore, one might assume that headers employing rotary wheels equipped with tines, such as the type disclosed in U.S. Pat. No. 3,958,399, issued to Ernest A. Schoeneberger on May 25, 1976 for "Header Attachments Structure" would overcome the mentioned shortcomings. However, devices of this character have only been partially successful, and even then for only certain crops (mainly soybeans and wheat that has not been beaten close to the ground and is truly "standing"), in that the reel that is used is of uniform diameter, being mounted for rotation about a single transverse axis. Such a mounting causes the tines to abruptly engage the growing or standing crop, doing so in a shock-like manner and maintaining engagement with the crop for only a fraction of the total circumferential travel of the tines. In other words, the prior art header lifts the rooted crop over only a short path. Furthermore, the tines do not strike the ground and consequently miss anything laying on the ground, or close to the ground.

The previously mentioned pinto beans, field peas and loaded grain are excellent examples of what is improperly handled by the reel disclosed in the aforesaid patent. Pinto beans in particular are right on the ground with the consequence that if the pods are not elevated above the cutter bar, the pods are snipped open and the beans are lost because they drop onto the ground. Lodged grain, for instance, must literally be scooped up in order for the cutter bar to be effective. Also, the crop, especially if the vine variety, is pushed rearwardly onto the top of the cutter bar by the tines of the reel disclosed in said patent, as the tines revolve and is not immediately transferred rearwardly to the auger, instead bunching up on the topside of the cutter bar.

As far as we are aware, this type of header has not met with success for the crops that have herein been specifically mentioned, thus resulting in the continued use of multiple passes over the field, all of which is time-consuming and inefficient as already mentioned.

SUMMARY OF THE INVENTION

Accordingly, one important object of our invention is to harvest crops, such as edible beans, field peas and lodged grain, but with a single pass of the equipment over the field.

Another object of the invention is to harvest a growing crop with but little loss of the crop, either by leaving part of the crop on the ground or having some of it blow away as is the case where the crop is first windrowed.

A further object of our invention is to reduce the amount of moisture damage previously experienced where standing or rooted crops are first cut and then windrowed, the windrowed crop being vulnerable to acquiring moisture while it is still on the ground awaiting later pickup. By completely harvesting a growing crop in one continuous operation, the crop does not remain on the ground and does not collect the moisture that it otherwise would and is thus not adversely affected.

Inasmuch as it is contemplated that when practicing our invention the growing or standing crop will be gently lifted for severance from the ground through the agency of the cutter bar on a combine, only a minimal amount of shelling results. This is in direct contrast with the impact action derived from conventional reels and the unwanted cutting of the beans or peas where the rooted crop is not lifted sufficiently so that its vines or stems are properly presented to the cutter bar for cutting just above the ground.

Yet another object of the invention is to continue to move or transfer the crop after it has been severed, doing so by the same tines that have initially lifted the rooted crop for cutting by the combine's cutter bar.

Still further, an object of the invention is to automatically release the cut crop at the proper time so that it gravitationally falls onto a curved floor beneath the auger, thereby enabling the auger to effectively move the severed crop centrally and then rearwardly into the combine's threshing mechanism, all as the auger is intended to do.

Still further, the invention has for an additional object the provision of apparatus of the foregoing character that lends itself readily for use with the header of a conventional combine. Therefore, our invention does not require any appreciable amount of capital investment, the amount of investment being actually less than the amount required for equipment in the past where several distinct passes over the field have been resorted to.

Also, the invention has for an additional object the reduction in the amount of energy required to harvest a crop for only one pass is needed in order to effect the harvesting, thereby conserving fuel that would be expended with equipment making multiple passes.

Briefly, our invention contemplates the provision of a transfer mechanism having a plurality of tines that are arranged so as to successively engage and lift a still rooted or standing crop, doing so sufficiently so that the cutter bar of a combine can then efficiently and effectively sever the crop. In this regard, the tines traverse a path such that they initially engage the still rooted crop in advance of the cutter bar and maintain the engagement of the crop after the cutter bar has performed its cutting operation. The severed or cut crop, while still being engaged by the tines that have lifted the crop for engagement by the cutter bar, is moved rearwardly and upwardly by these same tines to a proximal relation with the auger. The tines, being mounted on a rotatable shaft, are shifted by having the shaft rocked at the proper moment so that the cut or severed crop is released and dumped gravitationally onto the floor beneath the auger. The auger then takes over, moving the severed crop centrally and then rearwardly to the threshing portion of the combine in the manner the auger is designed to function.

DESCRIPTION OF THE PREFERRED EMBODIMENT

Figure 1:
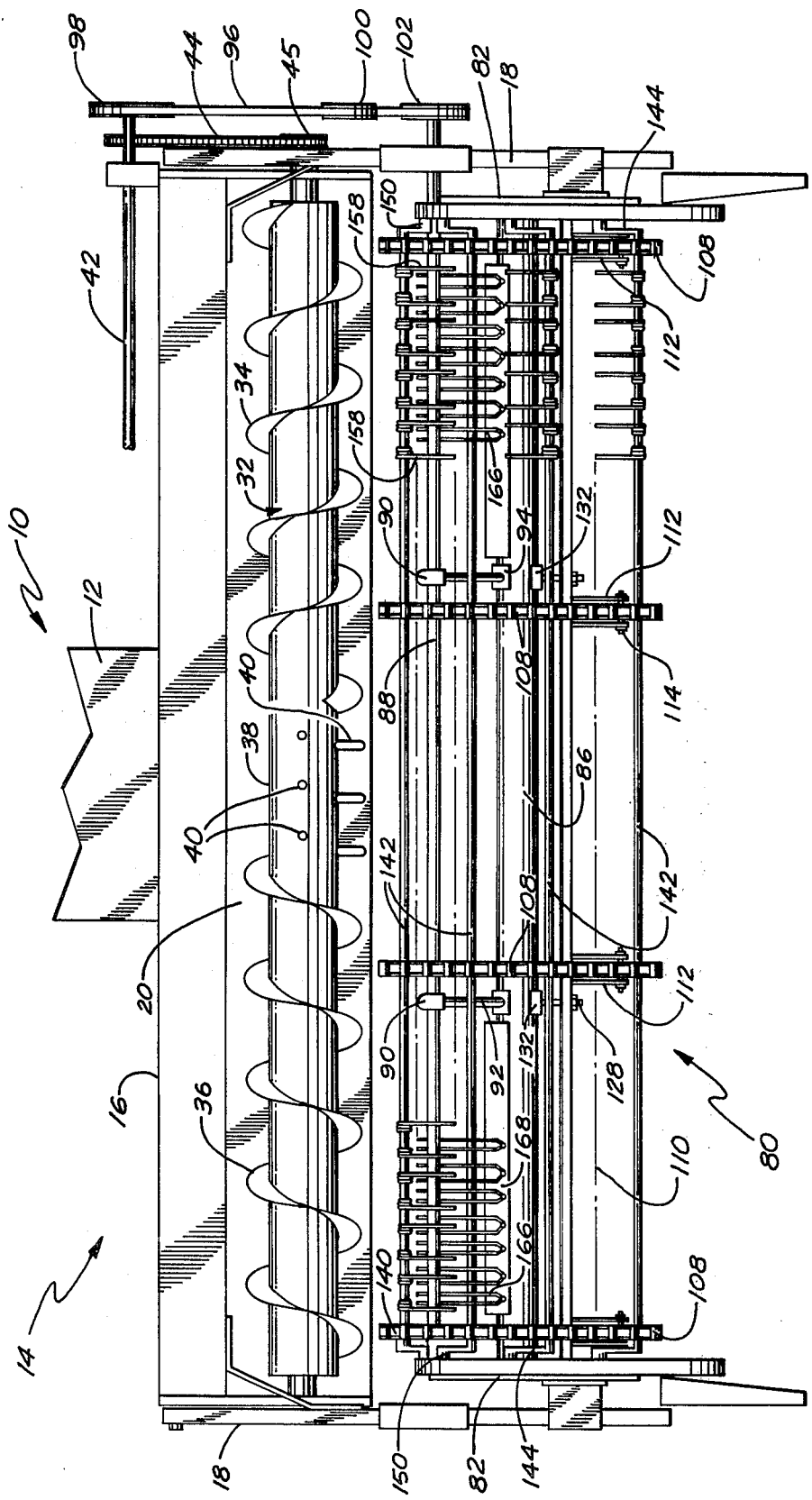
FIG. 1 is a top plan view of our transfer mechanism, the mechanism being mounted to the front end of a conventional combine.

Inasmuch as our invention can be used with a conventional combine, it is not deemed necessary to illustrate the details of a typical combine. Therefore, the combine has been shown only fragmentarily and has been given the reference numeral 10. More specifically, the elevator housing labeled 12 leads rearwardly into the combine so that the cut crop can be delivered to the threshing portion of the combine 10.

It is customary to detachably mount a crop harvesting header to the chassis of the combine. Such a header has been denoted generally by the reference numeral 14. The header 14 can be of the design shown in U.S. Pat. No. 2,755,912, issued on July 24, 1956 to Robert Ashton and titled "Harvesting Mechanism"; a typical header is also pictured in U.S. Pat. No. 4,216,641, granted on Aug. 12, 1980 to Earl E. Koch et al and titled "Crop Harvesting Machine".

Even though the details of the harvesting header 14 are not unique, nonetheless it will be necessary, or at least highly desirable, to refer to certain portions of the header 14 in order that the advantages of our invention will be better understood. Therefore, it is to be observed that the header 14 includes a rear wall 16 having an opening (not visible) that leads rearwardly to the elevator housing 12 of the combine 10. Hooks on the rear wall 16 permit the releasable mounting of the header 14 to the chassis of the combine 10. It is also to be observed that the header 14 includes laterally spaced side walls 18, as well as a curved or arcuate bottom wall 20. It will be understood that the walls 16, 18 and 20 are all welded together and constitute a sheet metal unit.

Figure 2:
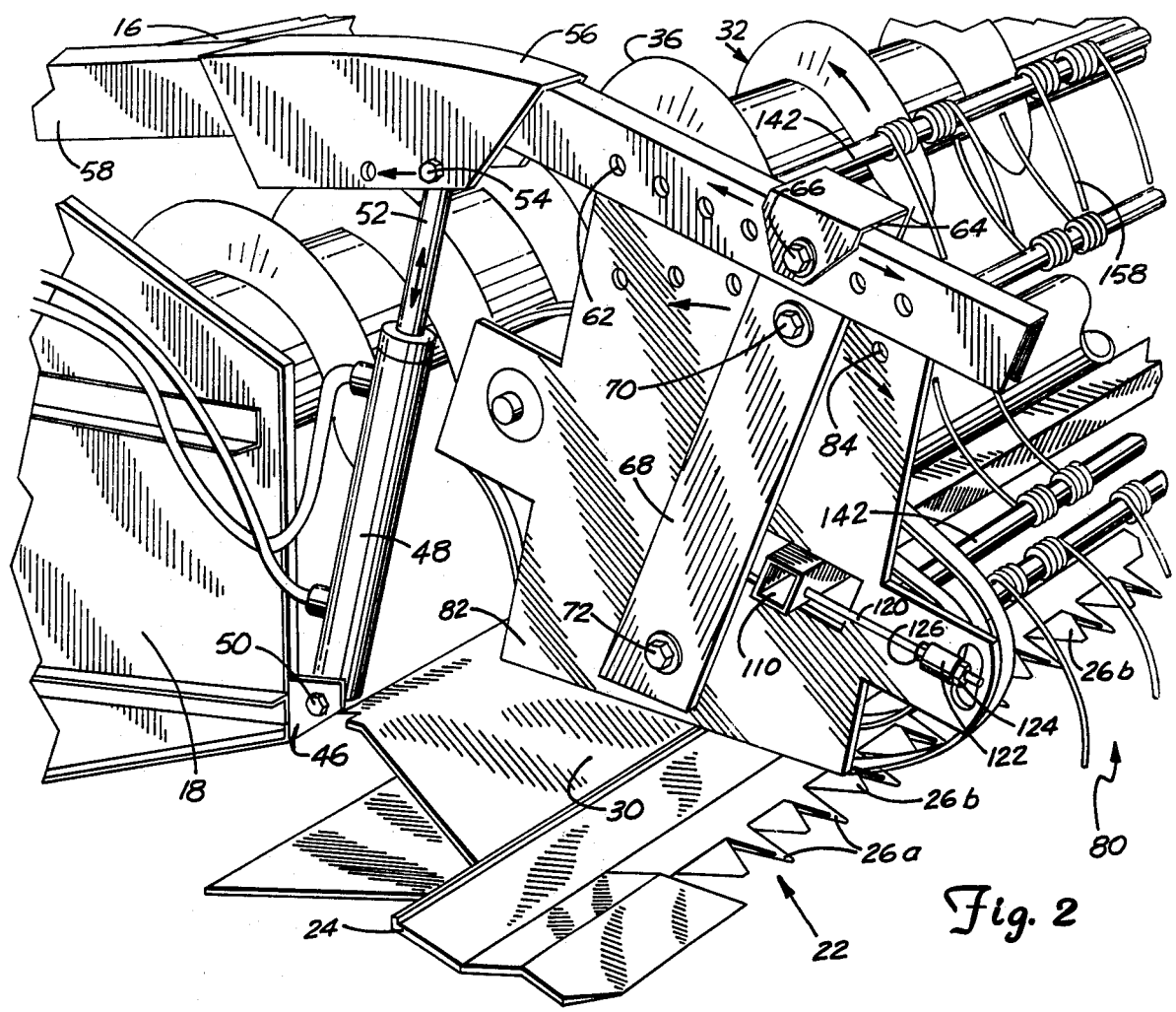
FIG. 2 is a fragmentary perspective view looking downwardly from the left in FIG. 1.

Included in the crop harvesting header 14 is a floating cutter bar 22. A cutter bar of the type shown is more fully described in U.S. Pat. No. 3,813,859, issued on June 4, 1974 to Harry S. Fuller et al for "Cutterbar Improvements In A Harvesting Machine". The cutter bar 22 includes, however, a barback labeled 24. As can be seen in FIG. 2, there are sickle or guard points 26a and oscillatory knives 26b. Since the shoe assemblies, and there are a number of laterally spaced such assemblies, are not actually part of our invention, they need not be described in any detail. Nonetheless, one such assembly has been illustrated in FIG. 4 and has been assigned the reference numeral 28. All that need be understood is that the shoe assembly rides over the ground and enables the cutter bar 22 to move up and down, following the terrain of the field over which the combine 10 is moving. It should be noted, though, that a sheet metal ramp 30 slopes upwardly from the barback 24, the upper edge thereof overlying slightly the curved bottom wall 20.

A conventional auger 32 has its ends journaled in the side walls 18. Oppositely directed helical flights 34 and 36 cause the cut crop to be augered centrally inwardly to a cylindrical portion 38 devoid of helical flights. Retractable rods 40 are actuated outwardly so as to move the cut crop that has been centrally augered by the flights 34, 36 rearwardly onto the elevator 12 from which it is delivered into the threshing portion of the combine 10.

Mounted for rotation on the rear wall 16 is a drive shaft 42 that is driven via a power takeoff from the combine 10. It is not necessary to illustrate just how the shaft 42 is coupled to the auger 32. However, it can be pointed out in passing that there is a V-belt mechanism that couples the shaft 42 to the chain labeled 44 which extends about a sprocket 45 attached to the auger 32.

As can be seen from FIG. 2, there are brackets 46, one at one side and one at the other side, to which a hydraulic cylinder 48 is connected by means of a bolt or pin 50. The cylinder 48 includes a reciprocable piston rod 52 having a pin 54 at its free or upper end. An inverted channel member 56 overlies and is welded to each of two side arms 58 which are pivoted at 60. The side arms 58 are provided with a series of holes 62 so that another channel member 64 can be properly positioned on the side arms 58 in each instance by means of a pin or a bolt 66. The channel member 64 has a downwardly extending arm 68 integral therewith. The arms 68 in each instance have vertically spaced holes therein for the accommodation of an upper bolt 70 and a lower bolt 72.

The foregoing description has dealt with a construction that is conventional, or at least typical, and serves mainly to orient the reader with respect to the transfer mechanism now to be described and which has been designated generally by the reference numeral 80. The transfer mechanism 80 comprises a pair of laterally spaced vertical plates 82, each having a series of arcuately spaced holes 84 therein. The upper bolt 70, while passing through the upper hole in the arm 68, also passes through a hole 84, the particular hole 84 being selected in accordance to the angulation or inclination that is desired as far as the entire transfer mechanism 80 is concerned.

Continuing with the description of the transfer mechanism 80, it is to be observed that a rather large diameter pipe 86, on the order of six inches in diameter, extends transversely between the two plates 82, having its ends welded thereto so that the plates 82 and the pipe 86 constitute a single structural unit.

Our transfer mechanism 80 includes a drive shaft 88 journaled in the plates 82. Inasmuch as the drive shaft 88 is of fairly small diameter intermediate support therefor is provided by means of bearings 90 mounted at the free ends of arms 92 which are attached at 94 to the pipe 86. The shaft 88 is driven by a belt 96 which is entrained about pulleys 98, 100 and 102, the pulley 98, as can be discerned from FIG. 1 being keyed to the earlier-mentioned shaft 42. Pulley 100 is simply an idler pulley, whereas the pulley 102 is mounted on the projecting end of the shaft 88. Actually, the number of pulleys 98, 100 and 102 have been reduced for drafting simplicity.

Figure 3:
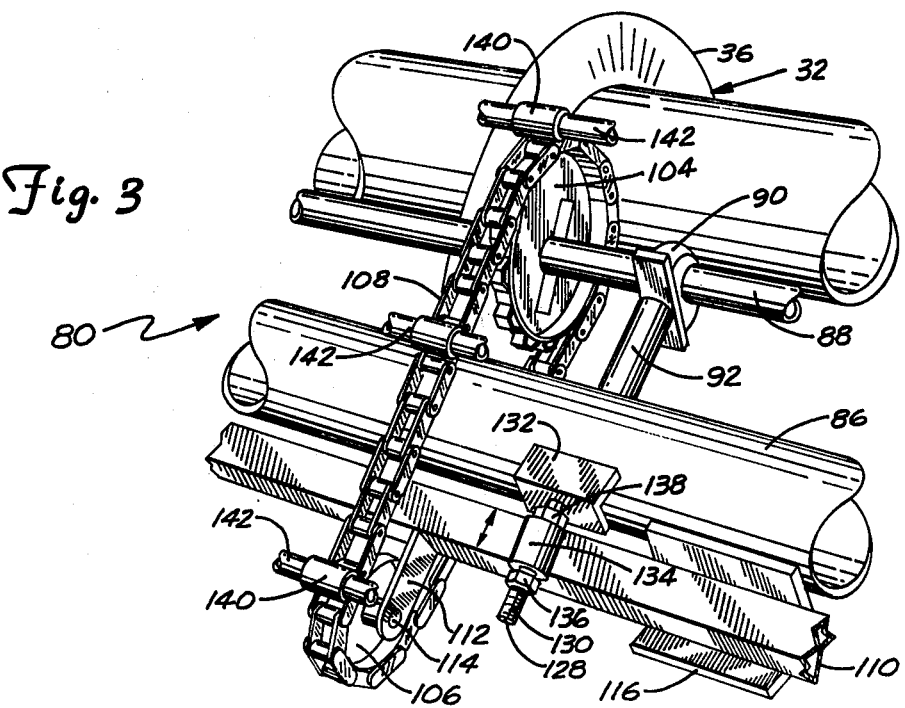
FIG. 3 is a fragmentary perspective view looking from the right of one of the takeup units.
Figure 4:
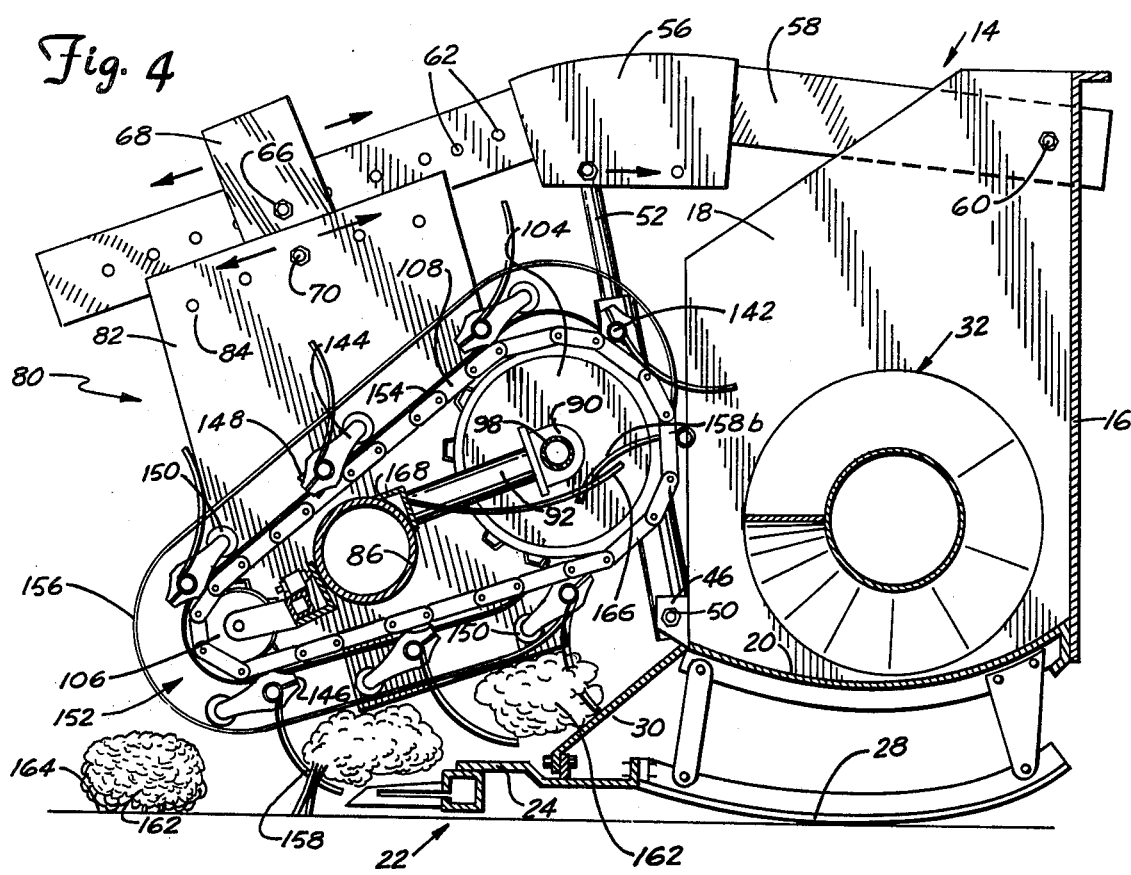
FIG. 4 is a vertical sectional view taken in the direction of line 4—4 of FIG. 1 for the purpose of showing the cam track that shifts the various tines into different angular positions.

There are a number of drive sprockets 104 keyed to the shaft 88, as can be readily appreciated from FIGS. 1, 3 and 4. There are an equal number of drive sprockets 106. Still further, a chain 108 encircles each pair of sprockets 104, 106.

Attention is directed at this time to a transverse tube having a square cross section, the tube having been identified by the reference numeral 110. A series of clevises or forks 112, there being one such clevise or fork 112 appearing in FIG. 3, are fixedly attached to one side of the tube 110. The free ends of the clevises 112 support a short shaft 114, the driven sprocket 106 being rotatably mounted on the shaft 114. Through the agency of a number of angle irons 116, one flange of the angle irons in each instance being welded to the pipe 86 and the other flange permitting the square cross section tube 110 to slidably rest thereon.

As can best be seen in FIG. 2, there is a rod 118 that is butt welded to the projecting end of the square cross section tube 110 appearing in this view. Of course, there is a second such rod 120 at the other side of the mechanism 80. It is to be understood, though, that the rod 120 has a threaded section that is received in a bushing 122 secured to the outer side of the plate 82 appearing in FIG. 2. By means of nuts 124 and 126 threadedly carried on the threaded section, it will be appreciated that the rod 120, and also that end of the square cross section tube 110, can be advanced or retracted.

It perhaps is somewhat unnecessary to refer to the additional rods 128 that correspond to the rods 120, one of the rods 128 being visible in FIG. 3. It, too, has a threaded section, this threaded section being labeled 130 which is butt welded to a foot 132 that is in turn welded to the previously mentioned pipe 86. The threaded section 130 is received in a bushing 134 that is welded to one side of the square cross section tube 110. By means of nuts 136 and 138 the tube 110 can be advanced or retracted.

Consequently, the rods 120 and 128 enable the driven or idler sprockets 106 to be positioned relative to the sprockets 104 so that any slack in the chains 108 can be taken up. In other words, the chains 108 are simply maintained taut by means of the devices involving the rods 120 and the rods 128. Any number of such devices can be employed, depending largely upon the length of the tube 110.

Having referred to the various chains 108, it can now be explained that a preferred number of sleeves 140 are secured at spaced intervals along each of the chains 108. From FIG. 4, it can be seen that seven sleeves 140 are attached to the particular chain 108 appearing in this view. In actual practice, we have used six sleeves.

The purpose of the various sleeves 140 is to journal a number of transverse shafts 142. At each end of each of the transverse shafts 142 is a rocker arm 144 having a split end 146 (see FIG. 4) through which a clamping bolt 148 extends so that the split end 146 can be securely clamped to its particular end of the particular shaft 142 on which it is mounted. The split end 146 permits the rocker arm 144 to be angularly oriented with respect to the shaft 142 in each instance. At the free or unclamped end of each rocker arm is a roller or a cam follower 150.

As best understood from FIG. 4 there is a cam groove 152 formed by inner and outer tracks 154 and 156. The groove 152, it can be explained, has been shown in phantom outline in FIG. 5. It should be pointed out, though, that the various rollers 150 are guided by the groove 152. It should also be understood that there is a pair of tracks 154 and 156 at each side of our transfer mechanism 80.

Figure 5:
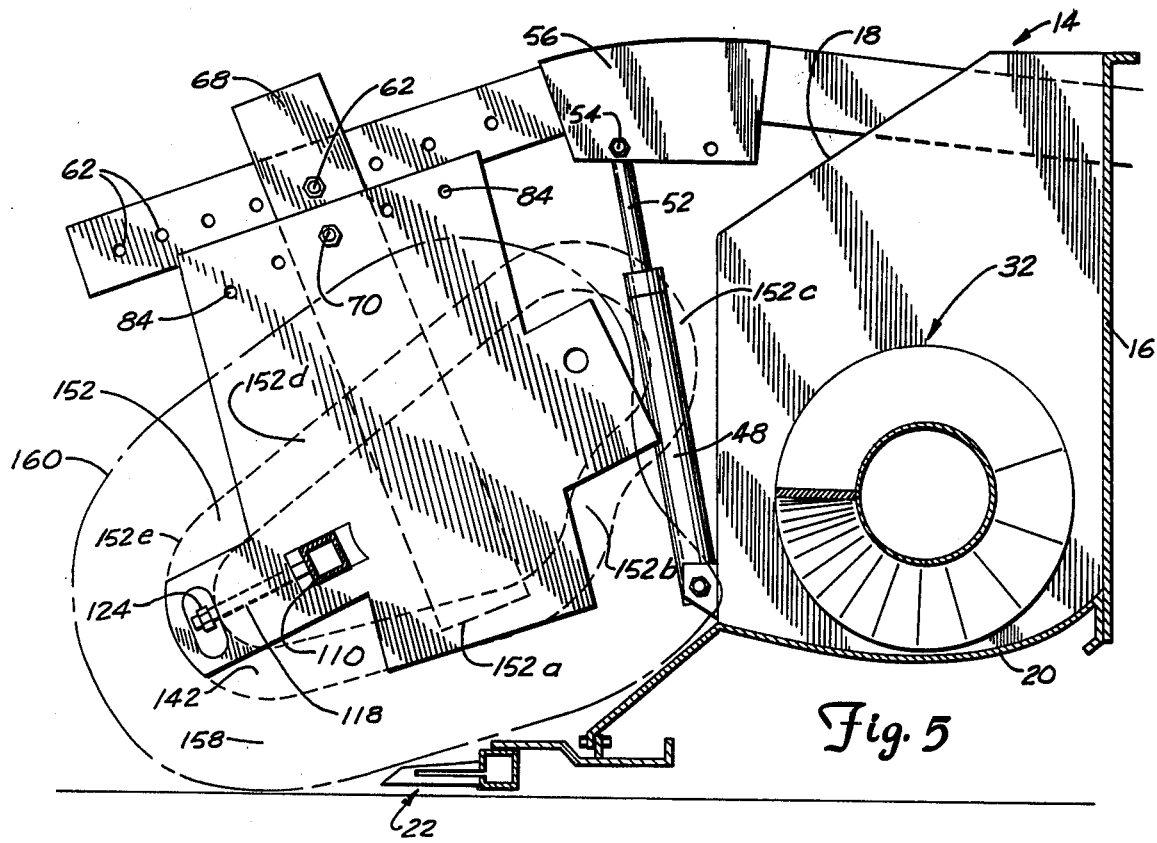
FIG. 5 is a rather diagrammatic view for the purpose of depicting the path that the tips of the various tines traverses, the view being taken in the general direction of line 5—5 of FIG. 1.

From FIGS. 4 and 5 it will be seen that the cam groove 152 has a generally straight and upwardly inclining portion 152a. The upper end of the straight portion 152a changes direction and the changed direction portion has been labeled 152b. The portion 152b performs an important function as will presently be made clear. A reversely curving or U-shaped portion of 152c connects with the offset portion 152b. There is a downwardly inclining straight portion indicated by the reference numeral 152d which connects with a reversely curved or U-shaped portion 152e. Thus, it will be noted that the cam groove 152 is continuous, being composed of the portions 152a–152e.

Also as best viewed in FIG. 4, although they appear in FIG. 1, too, are various rows of tines 158. The tines 158 are fixedly attached to the various shafts 142. Consequently, when any of the shafts 142, and seven such shafts have been depicted, are rocked or angularly rotated, the tines 158, which are laterally spaced along each of the shafts 142, are angularly moved or positioned. It will be helpful at this time to refer to the phantom path indicated by the reference numeral 160 in FIG. 5, for it is this path that the tips of the various tines 158 traverse. Of course, it should also be taken into account that the groove 152 has a configuration such as to produce the tip path 160.

From both FIGS. 4 and 5, even though only one tine 158 appears in FIG. 5, it can be seen that the tines are curved and that when traversing the groove portion 152a move linearly upwardly and rearwardly owing to the straight configuration of the groove portion 152a. It should also be observed that the tines 158 curve forwardly, that is to the left as viewed in FIGS. 4 and 5, and that their tips or free ends are therefore directed toward the cutter bar 22 as they approach the cutter bar. Furthermore, and this is understandable from FIG. 4, various plants 162 constituting the standing crop that is to be harvested are of a variety such that they are close to the ground, the ground being labeled 164.

It has previously been explained that the two plates 82 can be angularly adjusted by reason of the holes 84 formed therein. This is achieved by inserting the upper bolt 70 at each side in the most appropriate hole 84. In this way, the inclination of the entire transfer mechanism 80 can be adjusted. It can be recognized from FIGS. 4 and 5 that the mechanism can be tilted more downwardly or more upwardly and that the path 160, this being the path of the tine tips, can be changed. If the mechanism 80 is tilted more downwardly at the left, that is the front end thereof, then the tips of the tines 158 can be made to scrape along the ground. If raised, then they would engage the plants 162 constituting the rooted crop to be cut at a higher elevation.

It will also be perceived from FIG. 4 that the plants or crop 162 is being engaged in advance of the cutter bar 22. In other words, the forward end of the mechanism 80 is disposed ahead of the cutter bar so that the tines 158 as they reach their lowermost position, all as determined by the reversely turned portion 152e of the cam groove 152, have the chance to engage the growing or standing crop sufficiently in advance of the cutter bar 22 so that the crop can be lifted. It must be borne in mind that the tines 158, as viewed in FIG. 4, are moving rearwardly and upwardly at an inclination determined by the portion 152a of the cam groove 152.

It can also be appreciated from FIG. 4 that once the cutter bar 22 has severed the crop 162, doing so just above the surface of the ground 164, owing to the arcuate curvature imparted to each of the tines 158, the tines 158a continue to engage the cut or severed crop, moving the severed crop rearwardly up the sloping ramp 30. The severed crop 162 is not bunched on top of the bar back 24 as is the case with respect to the reel-mounted tines appearing in the previously identified Schoeneberger patent. Stated somewhat differently, the tines 158 successively engage and lift the standing or growing crop in advance of the cutter bar 22 and continue to engage the crop after the cutter bar 22 has severed the vines or stems from their rooted counterparts.

One of the features of our invention is to dump or release the cut crop at the proper moment so that it can be delivered to the auger 32 for further movement centrally and then rearwardly. Of course, it must be recognized that the cam followers or rollers 150 are shifted in accordance with the pattern of the groove 152. It is the function of the portion labeled 152b to act against the particular roller 150 as it reaches this portion so as to rock the particular shaft 142, doing so through the agency of the rocker arms 144, there being one such rocker arm at each end of each shaft 142. It might be well to assign a letter suffix to the particular tine 158 appearing in FIG. 4 that has been rocked into a dumping relationship. Since the groove portion 152b has caused this to happen, the tine has been indicated by the reference character 158b. The crux of the matter is that the severed crop is released at just the right moment so that it gravitationally falls downwardly onto the curved bottom wall 20 just beneath the auger 32.

Although appearing in FIG. 1, it can be better seen in FIG. 4 that so-called stripper fingers 166 project rearwardly from the pipe 86. More specifically, it can be explained that the fingers 166, which are actually rods like the tines 158, are butt welded at one end to an angle member 168 which is in turn welded to the pipe 86. The purpose of the fingers 166 is to "strip" the cut crop from the tines 158b that have been actuated into their dumping or releasing position, doing so as the tines 158b (and all the tines 158 as they successively approach the auger 32) pass by.

After release by the row of tines, one of which has been identified as 158b, the helical flights 34 and 36 of the auger 32 act against the severed crop so as to move it inwardly or centrally. It is then that the rods 40 are projected from their retracted position to move the cut crop rearwardly onto the elevator 12. The elevator 12, of course, moves the crop into the threshing portion of the combine 10.

Having presented the foregoing description, much of the operation has been dealt with. Nonetheless, it will perhaps be helpful in appreciating the benefits to be derived from a practicing of our invention to recapitulate somewhat. Actually, reference to FIG. 4 is all that is necessary in order to understand that the various tines are constrained to move upwardly and rearwardly along an inclined path (see the path 160 in FIG. 5). In so doing, they engage the rooted or uncut crop ahead of the cutter bar 22. Also, owing to the inclined rearward movement of the various tines 158, they successively engage the standing or still rooted crop and lift it, stretching it somewhat by reason of the roots holding the lower ends of the crop. In its "stretched" condition, the cutter bar 22 can engage the vines or stems of the standing crop and snip such vines or stems without the peas, beans or grain being cut by the oscillating knives 26b of the cutter bar 22. Whenever the pods, such as those on pinto bean vines, are cut by the cutter bar 22, the beans simply fall out of the opened pods onto the ground.

By reason of the continued engagement of the tines 158 with the cut or severed crop, there is no pushing of the crop onto the top of the cutter bar, for the tines 158 act on the severed crop to advance it therealong and upwardly across the inclined ramp 30. As already mentioned, the tines identified specifically by the reference numeral 158b are shifted into a more vertical, actually a condition in which the lower tips of the various tines occupying the dumping position are at what can be termed seven o'clock, as viewed in FIG. 4.

It is after the tines have dumped the cut or severed crop that the groove portion 152c by reason of the segments of the inner and outer tracks 154, 156, cause the followers 150 to rock the shafts so that the tines assume the position that they appear in as they traverse the portion 152d of the groove. Of course, when the end of the downwardly sloping portion 152d of the groove 152 is reached, then the groove portion 152e returns the tines into their crop engaging position and the entire action is successively repeated for each of the seven rows of tines that are illustrated in the exemplary situation.

We claim:

1. Crop havesting apparatus comprising a vehicle, a cutter bar carried on the forward end of the vehicle, means supporting said cutter bar at an elevation closely adjacent the surface of the ground over which said cutter bar passes for severing a rooted or standing vine crop, such as pinto beans, close to the ground, means for engaging said vine crop including a plurality of longitudinally spaced rows of laterally spaced curved tines, means mounting said longitudinally spaced rows of tines forwardly of said vehicle so that the tips or free ends of said rows of tines successively engage said rooted or standing vine crop at an elevation also closely adjacent the surface of the ground and slightly in advance of said cutter bar to lift a portion of said vine crop above said cutter bar while still rooted or standing sufficiently high for severance by said cutter bar of a lower portion of said vine crop at an elevation closely adjacent the surface of the ground as said vehicle moves fowardly, and means for moving said tines rearwardly towards said cutter bar and to cause said tips or lower ends of said tines to move rearwardly in a closely adjacent relation to said cutter bar so that said cutter bar severs said vine crop at an elevation generally beneath the beans on said vine crop, said spaced curved tines then transferring said severed crop rearwardly.

2. Crop harvesting apparatus in accordance with claim 1 in which said cutter bar is a floating cutter bar having forwardly projecting oscillatory knives and the tips or free ends of said tines follow an upwardly inclined path closely adjacent said forwardly projecting knives as they move rearwardly.

3. Crop harvesting apparatus in accordance with claim 1 in which said tines have an arcuate configuration with an intermediate portion thereof curving forwardly.

4. Crop harvesting apparatus in accordance with claim 3 in which the lower ends of said tines point rearwardly when initially engaging said standing crop.

5. Crop harvesting apparatus in accordance with claim 4 including an auger rotatably mounted on the vehicle rearwardly of said cutter bar and at an elevation somewhat thereabove.

6. Crop harvesting apparatus in accordance with claim 5 including means for causing said engaging means to release the severed crop at a location adjacent said auger.

7. Crop harvesting apparatus in accordance with claim 6 in which said engaging means includes a plurality of longitudinally spaced rows of laterally spaced tines, said rows of tines successively engaging said rooted or standing crop to lift said crop sufficiently for severance by said cutter bar and then moving the severed crop rearwardly to said location, said location being just forwardly of said auger.

8. Crop harvesting apparatus in accordance with claim 5 including means for rocking said tines into a crop releasing position adjacent said auger so that said severed crop falls gravitationally downwardly to said auger.

9. Crop harvesting apparatus in accordance with claim 8 including a transverse shaft for each row of tines, the tines of a given row being attached to their particular shaft in a laterally spaced relationship therealong.

10. Crop harvesting apparatus comprising a vehicle, a cutter bar carried on the forward end of the vehicle and adapted to sever a rooted or standing vine crop, such as pinto beans, at an elevation closely adjacent the surface of the ground, an auger rotatably mounted on the vehicle rearwardly of said cutter bar and at an elevation somewhat thereabove, and means for engaging said vine crop including a plurality of longitudinally spaced rows of laterally spaced arcuately configured tines with an intermediate portion thereof curving forwardly, the lower tips or free ends of said rows of tines pointing rearwardly when intitially and successively engaging said rooted or standing vine crop at an elevation also closely adjacent the surface of the ground and slightly in advance of said cutter bar to lift a portion of said vine crop while still rooted or standing sufficiently high for severance by said cutter bar of a lower portion of said vine crop at an elevation closely adjacent the surface of the ground as said vehicle moves forwardly, the tips or free ends of said tines following an upwardly and rearwardly inclined path closely adjacent said cutter bar so that said cutter bar severs said vine crop at an elevation generally beneath the beans on said vine crop and the tines of said engaging means then transferring said crop rearwardly, means for rocking said tines into a crop releasing portion adjacent said auger so that said severed crop falls gravitationally downwardly to said auger, a transverse shaft for each row of tines, the tines of a given row being attached to their particular shaft to provide said laterally spaced relationship of said tines, a rocker arm for each shaft, a cam follower adjacent the free end of each rocker arm, and cam means engaging said cam followers for rotating each shaft into various angular positions to cause said tines to assume a position with the lower ends thereof somewhat rearwardly and beneath the particular shaft on which they are carried when initially engaging said standing crop, said cam means causing said followers to rotate each shaft into an angular position as that particular shaft approaches said auger so that the lower ends of said tines are then in substantial vertical alignment beneath the shaft on which they are carried when reaching said releasing location.

11. Crop harvesting apparatus in accordance with claim 10 including curved floor means beneath said auger and extending somewhat forwardly thereof, said severed crop dropping onto said floor means when released by said engaging means.

12. Crop harvesting apparatus in accordance with claim 4 in which said vehicle constitutes a combine, said auger when receiving said severed crop causing said severed crop to move centrally and then rearwardly so that a threshing operation can take place within the combine.

13. Apparatus for harvesting vine crops, such as pinto beans, comprising a vehicle, a cutter bar mounted forwardly of said vehicle and close to the surface of the ground the vehicle traverses, and a transfer mechanism supported by said vehicle so that its forward end is spaced ahead of said cutter bar and the rear end thereof is spaced to the rear thereof and at a higher elevation than the forward end thereof, said mechanism including a plurality of longitudinally spaced rows of forwardly curving tines, the tines of each row being laterally spaced with respect to each other, means for moving said tines rearwardly from the forward end of said mechanism and past said cutter bar at an inclined relation so that said tines initially engage said standing crop closely adjacent the ground and forwardly of said cutter bar to lift the standing crop sufficiently high so as to be severed by said cutter bar at an elevation beneath the beans on the vines being severed, said tines then moving the severed crop rearwardly and upwardly to an elevated location, an intermediate portion of each forwardly curved tine being above and forwardly disposed relative to said cutter bar as the lower end of each tine moves forwardly toward said cutter bar, and cam means for causing said tines to be angularly rocked to release or dump the severed crop at said elevated location.

14. Crop harvesting apparatus in accordance with claim 13 including a plurality of lateral shafts, said tines being carried on said shafts, a rocker arm for each shaft, said cam means including a cam follower in each rocker arm and a track for guiding said followers, said track changing direction to cause said followers to angularly rotate each shaft and to angularly rock said tines as each shaft moves to a position near said auger.

15. Crop harvesting apparatus in accordance with claim 14 in which said moving means includes a pair of laterally spaced endless chains, the ends of said shafts being journaled on said chains at longitudinally spaced locations therealong.

16. In combination with a combine having a floating cutter bar close to the ground the combine is to traverse and an auger located rearwardly and at an elevation above said cutter bar, a transfer mechanism comprising frame means, a pair of laterally spaced endless chains, a plurality of shafts, respective means for journaling said shafts to said chains at longitudinally spaced locations therealong, a rocker arm extending vertically from one end of each of said shafts, a cam follower at the free end of each of said arms, track means forming a groove for receiving said followers therein, means extending forwardly from said combine for mounting said transfer mechanism on said combine at an inclination so that the forward end thereof is inclined downwardly and is ahead of said cutter bar, the rear end of said mechanism being at an elevation near said auger, and drive means for moving said chains in a direction to cause the tips or free ends of said tines to engage a standing crop of the vine type also closely to the ground traversed by the combine and to lift the standing crop sufficiently for immediate severance by said cutter bar as said combine moves forwardly, said mounting means positioning said transfer mechanism so that the tips or free ends of said tines follow a path close to said cutter bar to effect said severance at a height such as to cut only the stems of said crop and the inclination of said mechanism then causing said tines to move the cut crop rearwardly and upwardly in the direction of said auger, said track means changing direction adjacent said auger, so as to cause the followers to rock each shaft as it approaches said auger, to cause the tines on that shaft to assume a more vertical relationship, thereby releasing the cut crop for engagement by said auger.

* * * * *

UNITED STATES PATENT AND TRADEMARK OFFICE
CERTIFICATE OF CORRECTION

PATENT NO. : 4,353,201

DATED : October 12, 1982

INVENTOR(S) : Michael J. Pierce; Kevin J. Pierce; Wayne A. Pierce

It is certified that error appears in the above-identified patent and that said Letters Patent are hereby corrected as shown below:

Column 10, line 6, delete "portion" and insert --position--.

*Signed and Sealed this*

*Eighteenth* Day of *January 1983*

[SEAL]

*Attest:*

GERALD J. MOSSINGHOFF

*Attesting Officer*     *Commissioner of Patents and Trademarks*